United States Patent Office 3,663,607
Patented May 16, 1972

3,663,607
1-CARBAMOYLALKYL PHENOXY-3-AMINO-2-PROPANOLS
Arthur Michael Barrett, John Carter, Roy Hull, David James Le Count, and Christopher John Squire, Macclesfield, England, assignors to Imperial Chemical Industries Limited, London, England
No Drawing. Filed Feb. 6, 1970, Ser. No. 9,451
Claims priority, application Great Britain, Feb. 21, 1969, 9,445/69
Int. Cl. C07c *103/28*
U.S. Cl. 260—501.1                9 Claims

ABSTRACT OF THE DISCLOSURE

Novel 1-(electronegatively-substituted-alkyl- or alkenylphenoxy)-3-alkylamino-2-propanol derivatives, for example 1-p-carbamoylmethylphenoxy-3-isopropylamino-2-propanol, methods for their preparation and pharmaceutical compositions containing them. The compounds possess β-adrenergic blocking activity and are useful in the treatment of heart diseases and other complaints in man.

This invention relates to new alkanolamine derivatives which possess β-adrenergic blocking activity and which are therefore useful in the treatment or prophylaxis of heart diseases, for example angina pectoris and cardiac arrhythmias, and in the treatment of hypertension and phaeochromocytoma, in man.

According to the invention we provide new alkanolamine derivatives of the formula:

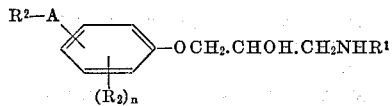

wherein $R^1$ stands for an alkyl or hydroxyalkyl radical, wherein $R^2$ stands for an electronegative radical, wherein A stands for an alkylene or alkenylene radical, wherein $n$ stands for the integer 1 or 2 and wherein $R^3$, the values of which may be the same or different when $n$ stands for 2, is selected from hydrogen and halogen atoms and alkyl, cycloalkyl, alkenyl, nitro, hydroxy, alkylthio, alkoxy, alkenyloxy, aryl, aryloxy, aralkyl, aralkoxy, hydroxyalkyl, alkoxyalkyl, halogenoalkyl, acyl, alkoxycarbonyl and cyano radicals; and the esters thereof; and the aldehyde-condensation products thereof; and the acid-addition salts thereof.

It is to be understood that the above definition of alkanolamine derivatives encompasses all possible stereoisomers thereof, and mixtures thereof.

A suitable value for $R^1$ is, for example, an alkyl or hydroxyalkyl radical each of up to 6 carbon atoms and particularly of 3, 4 or 5 carbon atoms, which preferably is branched at the α-carbon atom, for example the isopropyl, s-butyl, t-butyl, 2-hydroxy-1,1-dimethylethyl or 2-hydroxy-1-methylethyl radical.

A suitable value for $R^2$ is, for example, an acyl radical, or a functional derivative of the carboxy radical.

A suitable value for $R^2$ when it stands for an acyl radical is, for example, an alkanoyl radical of up to 6 carbon atoms, for example the acetyl or propionyl radical.

A suitable value for $R^2$ when it stands for a functional derivative of the carboxy radical is, for example, the cyano radical; or an alkoxycarbonyl radical, for example an alkoxycarbonyl radical of up to 6 carbon atoms, for example the methoxycarbonyl or ethoxycarbonyl radical; or the carbamoyl radical; or an alkylcarbamoyl or alkenylcarbamoyl radical, for example such a radical wherein the alkyl or alkenyl part each contains up to 6 carbon atoms, for example the methylcarbamoyl, isopropylcarbamoyl, n-butylcarbamoyl or allylcarbamoyl radical; or the carbazoyl radical.

A suitable value for A is, for example, an alkylene radical of from 1 to 5 carbon atoms, for example the methylene, ethylene, ethylidene

or trimethylene radical, or an alkanylene radical of from 2 to 5 carbon atoms, for example the vinylene radical.

A suitable value for $R^3$ when it stands for a halogen atom is, for example, the fluorine, chlorine, bromine or iodine atom.

A suitable value for $R^3$ when it stands for an alkyl radical is, for example, an alkyl radical of up to 6 carbon atoms, for example the methyl, n-propyl or s-butyl radical.

A suitable value for $R^3$ when stands for a cycloalkyl radical is, for example, a cycloalkyl radical of up to 8 carbon atoms, for example the cyclopropyl, cyclobutyl or cyclopentyl radical.

A suitable value for $R^3$ when it stands for an alkenyl radical is, for example, an alkenyl radical of up to 6 carbon atoms, for example the allyl radical.

A suitable value for $R^3$ when it stands for an alkylthio, alkoxy or alkenyloxy radical is, for example, an alkylthio, alkoxy or alkenyloxy radical each of up to 5 carbon atoms, for example the methylthio, methoxy, isopropoxy or allyloxy radical.

A suitable value for $R^3$ when it stands for an aryl or aryloxy radical is, for example, an aryl or aryloxy radical each of up to 10 carbon atoms, for example the phenyl or phenoxy radical.

A suitable value for $R^3$ when it stands for an aralkyl or aralkoxy radical is, for example, an aralkyl or aralkoxy radical each of up to 10 carbon atoms, for example the benzyl, α-phenylethyl or benzyloxy radical.

A suitable value for $R^3$ when it stands for a hydroxyalkyl, alkoxyalkyl or halogenoalkyl radical is, for example, an alkyl radical of up to 5 carbon atoms which is substituted by one or more hydroxy radicals, alkoxy radicals of up to 4 carbon atoms or halogen atoms, for example the hydroxymethyl, methoxymethyl or trifluoromethyl radical.

A suitable value for $R^3$ when it stands for an acyl or alkoxycarbonyl radical is, for example, an acyl or alkoxycarbonyl radical each of up to 6 carbon atoms, for example the acetyl, propionyl, methoxycarbonyl or ethoxycarbonyl radical.

Suitable esters of the alkanolamine derivatives of the invention are, for example, esters derived from an aliphatic carboxylic acid of up to 20 carbon atoms, for example acetic, palmitic, stearic or oleic acid, or esters derived from an aromatic carboxylic acid of up to 10 carbon atoms, for example benzoic acid, and the acid-addition salts thereof.

Suitable aldehyde condensation products of the alkanolamine derivatives of the invention are, for example, the 5-aryloxymethyl-3-alkyloxazolidine derivatives obtained by the condensation of an aldehyde of the formula $R^4.CHO$, wherein $R^4$ stands for hydrogen or for an alkyl radical, with the alkanolamine derivatives of the invention, and the acid-addition salts thereof.

A suitable value for $R^4$ when it stands for an alkyl radical is, for example, an alkyl radical of up to 4 carbon atoms, for example the isopropyl radical.

Suitable acid-addition salts of the alkanolamine derivatives of the invention, or of the esters thereof, or of the aldehyde condensation products thereof are, for example, salts derived from inorganic acids, for example hydrochlorides, hydrobromides, phosphates or sulphates, or salts derived from organic acids, for example oxalates, lactates, tartrates, acetates, salicylates, citrates, benzoates, β-naphthoates, adipates or 1,1-methylene-bis-(2-hydroxy-3-naphthoates), or salts derived from acidic synthetic resins, for example sulphonated polystyrene resins, for example "Zeo-Karb" 225 ("Zeo-Karb" is a trademark).

A preferred group of alkanolamine derivatives of the invention comprises compounds of the formula:

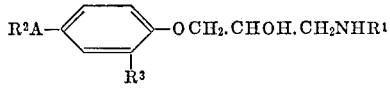

wherein $R^1$, $R^2$, A and $R^3$ have the meanings stated above, and the esters and aldehyde condensation products and acid-addition salts thereof. Of these, particularly preferred groups comprise compounds of the latter formula given above wherein $R^1$ stands for the isopropyl or t-butyl radical and wherein either (a) $R^2$ stands for the carbamoyl radical or for an alkylcarbamoyl radical wherein the alkyl radical contains up to 3 carbon atoms, A stands for the methylene radical and $R^3$ stands for hydrogen, or for a halogen atom, or for an alkyl, alkenyl or alkoxy radical each of up to 4 carbon atoms; or (b) $R^2$ stands for the acetyl, carbamoyl or cyano radical, A stands for the ethylene or vinylene radical and $R^3$ stands for an alkoxy radical of up to 4 carbon atoms; and the acid-addition salts thereof.

Specific alkanolamine derivatives of the invention are, for example, those hereinafter described in the examples. Of these, particularly active compounds are 1-p-carbamoylmethylphenoxy-3-isopropylamino-2-propanol;
1-p-(N-isopropylcarbamoylmethyl)phenoxy-3-isopropylamino-2-propanol;
1-(2-bromo-4-carbamoylmethylphenoxy)-3-isopropylamino-2-propanol;
1-p-carbamoylmethylphenoxy-3-t-butylamino-2-propanol;
1-m-carbamoylmethylphenoxy-3-isopropylamino-2-propanol;
1-(2-allyl-4-carbamoylmethylphenoxy)-3-isopropylamino-2-propanol;
1-(4-carbamoylmethyl-2-methoxyphenoxy)-3-isopropylamino-2-propanol;
1-p-(N-methylcarbamoylmethyl)-phenoxy-3-isopropylamino-2-propanol;
1-(4-carbamoylmethyl-2-iodophenoxy)-3-isopropylamino-2-propanol;
1-(4-carbamoylmethyl-2-methylphenoxy)-3-isopropylamino-2-propanol;
1-(4-carbamoylmethyl-2-n-propylphenoxy)-3-isopropylamino-2-propanol;
1-(4-carbamoylmethyl-2-s-butylphenoxy)-3-isopropylamino-2-propanol;
1-(4-carbamoylmethyl-2-methoxyphenoxy)-3-t-butylamino-2-propanol;
1-(4-N-methylcarbamoylmethyl-2-n-propylphenoxy)-3-isopropylamino-2-propanol;
1-(2-allyl-4-N-methylcarbamoylmethylphenoxy)-3-isopropylamino-2-propanol;
1-(2-allyl-4-N-methylcarbamoylmethylphenoxy)-3-t-butylamino-2-propanol;
1-(4-carbamoylmethyl-2,5-dimethylphenoxy)-3-isopropylamino-2-propanol;
1-(4-β-carbamoylethyl-2-methoxyphenoxy)-3-isopropylamino-2-propanol;
1-(4-β-carbamoylethyl-2-methoxyphenoxy)-3-t-butylamino-2-propanol;
1-[2-methoxy-4-(3-oxobutyl)phenoxy]-3-isopropylamino-2-propanol;
1-(4-β-cyanoethyl-2-methoxyphenoxy)-3-isopropylamino-2-propanol;
1-(2-methoxy-4-β-methoxycarbonylvinylphenoxy)-3-isopropylamino-2-propanol;
1-(4-β-cyanovinyl-2-methoxyphenoxy)-3-isopropylamino-2-propanol;
1-(4-β-carbamoylvinyl-2-methoxyphenoxy)-3-isopropylamino-2-propanol and
1-[2-methoxy-4-(3-oxobutyl-1-enyl)phenoxy]-3-t-butylamino-2-propanol and the acid-addition salts thereof.

Specific aldehyde condensation products of the invention are 5-(p-carbamoylmethylphenoxymethyl)-3-isopropyloxazolidine and the acid-addition salts thereof.

According to a further feature of the invention we provide a process for the manufacture of the alkanolamine derivatives of the invention which comprises the interaction of a compound of the formula:

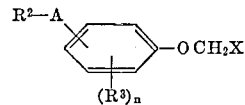

wherein $R^2$, A, $R^3$ and $n$ have the meanings stated above, and wherein X stands for the group

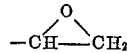

or the group —CHOH.CH$_2$Y, wherein Y stands for a halogen atom, or of mixtures of such compounds wherein X has both meanings stated above, with an amine of the formula $NH_2R^1$, wherein $R^1$ has the meaning stated above.

A suitable value for Y is, for example, the chlorine or bromine atom. The interaction may be carried out at ambient temperature or it may be accelerated or completed by the application of heat, for example by heating to a temperature of 90–110° C.; it may be carried out at atmospheric or at elevated pressure, for example by heating in a sealed vessel; and it may be carried out in an inert diluent or solvent, for example methanol or ethanol, or an excess of the amine of the formula $NH_2R^1$, wherein $R^1$ has the meaning stated above, may be used as diluent or solvent.

The starting material used in the above process may be obtained by the interaction of the corresponding phenol with an epihalohydrin, for example epichlorohydrin. The said starting material may be isolated or it may be prepared and used in situ without isolation.

According to a further feature of the invention we provide a process for the manufacture of the alkanolamine derivatives of the invention which comprises the interaction of a compound of the formula:

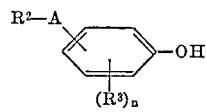

wherein $R^2$, A $R^3$ and $n$ have the meanings stated above, with a compound of the formula:

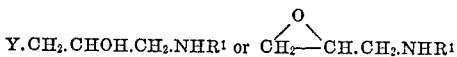

wherein $R^1$ and Y have the meanings stated above.

The last-named interaction may conveniently be carried out in the presence of an acid-binding agent, for example sodium hydroxide. Alternatively, an alkali metal derivative of the phenol reactant, for example the sodium or potassium derivative, may be used as starting material. The interaction may be carried out in a diluent or solvent, for example methanol or ethanol, and it may be accelerated or completed by the application of heat, for example by heating to the boiling point of the diluent or solvent.

According to a further feature of the invention we provide a process for the manufacture of those of the alkanolamine derivatives of the invention wherein A stands for the vinylene radical which comprises the interaction in the presence of a base of a compound of the formula:

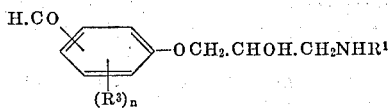

wherein $R^1$, $R^3$ and $n$ have the meanings stated above, with a compound of the formula:

$$R^2.CH_2.R^5 \text{ or } R^2.CH_2\text{—}PO(OR^6)_2$$

wherein $R^2$ has the meaning stated above, wherein $R^5$ stands for hydrogen or for the carboxy radical, and wherein $R^6$ stands for an alkyl radical, for example an alkyl radical of up to 6 carbon atoms, for example the ethyl radical.

The reaction involving a compound of the formula $R^2.CH_2.R^5$ may be carried out, for example, under conditions suitable for the Knoevenagel or Perkin condensation, for example in the presence of piperidine as the base, in a diluent or solvent, for example pyridine, at an elevated temperature, for example at a temperature of 90–110° C.

The reaction involving a compound of the formula:

$$R^2.CH_2\text{—}PO(OR^6)_2$$

may be carried out, for example, under conditions suitable for the Wittig reaction, for example in the presence of a metal hydride, for example sodium hydride, as base, in a diluent or solvent, for example 1,2-dimethoxyethane, at ambient temperature.

According to a further feature of the invention we provide a process for the manufacture of the alkanolamine derivatives of the invention which comprises the hydrogenolysis of a compound of the formula:

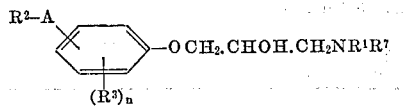

wherein $R^1$, $R^2$, $A$, $R^3$ and $n$ have the meanings stated above and wherein $R^7$ stands for a hydrogenolysable radical, or an acid-addition salt thereof.

A suitable value for $R^7$ is, for example, an α-aryl-alkyl radical, for example the benzyl radical. The hydrogenolysis may be effected, for example, by catalytic hydrogenation, for example by hydrogenation in the presence of a palladium-on-charcoal catalyst, in an inert diluent or solvent, for example ethanol or aqueous ethanol. The process may be accelerated or completed by the presence of an acidic catalyst, for example hydrochloric or oxalic acid.

The starting material used in the last-mentioned process may be obtained by a similar process to any of the processes mentioned above, except that an amine of the formula $NHR^1R^7$ is used in place of an amine of the formula $NH_2R^1$, or a compound containing the group —$NR^1R^7$ is used in place of the corresponding compound containing the group —$NHR^1$.

According to a further feature of the invention we provide a process for the manufacture of those of the alkanolamine derivatives of the invention wherein $R^1$ stands for a radical of the formula —$CHR^8R^9$, wherein $R^8$ stands for an alkyl radical and $R^9$ stands for an alkyl or hydroxyalkyl radical, which comprises the interaction of an amino derivative of the formula:

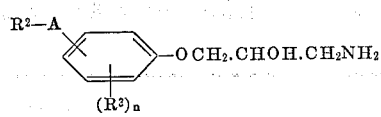

wherein $R^2$, $A$, $R^3$ and $n$ have the meanings stated above, or an acid-addition salt thereof, with a carbonyl compound of the formula $R^8.CO.R^9$, wherein $R^8$ and $R^9$ have the meanings stated above, under reducing conditions.

Suitable reducing conditions are those provided by the presence of hydrogen and a hydrogenation catalyst, for example palladium or platinum, in an inert diluent or solvent, for example in one or more solvents selected from water, ethanol and an excess of the carbonyl compound used as starting material; or by the presence of an alkali metal borohydride, for example sodium borohydride, in an inert diluent or solvent, for example in one or more solvents selected from water, ethanol, methanol and an excess of the carbonyl compound used as starting material. It is to be understood that when in the starting material $R^3$ stands for a halogen atom or for an alkenyl, nitro, alkylthio, alkenyloxy, aralkoxy, acyl or cyano radical, hydrogen and a hydrogenation catalyst are preferably not used to provide the reducing conditions, in order to prevent the radical $R^3$ from being affected by catalytic hydrogenation.

The amino derivative used as starting material in the last-mentioned process may be obtained by the interaction of the corresponding epoxide or halohydrin with ammonia.

It is to be understood that a compound wherein $R^2$ stands for a functional derivative of the carboxy radical may be converted into a different compound wherein $R^2$ stands for a different functional derivative of the carboxy radical. Thus, for example, a compound wherein $R^2$ stands for the cyano radical may be hydrolysed to the corresponding compound wherein $R^2$ stands for the carbamoyl radical; or a compound wherein $R^2$ stands for an alkoxycarbonyl radical, for example the ethoxycarbonyl radical, may be converted into the corresponding compound wherein $R^2$ stands for the carbamoyl or carbazoyl radical or for an alkylcarbamoyl or alkenylcarbamoyl radical, for example the N-isopropylcarbamoyl radical, by interaction respectively with ammonia or hydrazine or an amine, for example isopropylamine. It is further to be understood that if the first process of the invention is used with a starting material wherein $R^2$ stands for an alkoxycarbonyl radical, the amine of the formula $NH_2R^1$ may react with said alkoxycarbonyl radical so as to convert said radical into the corresponding alkylcarbamoyl radical during the process.

It is yet further to be understood that a compound wherein $A$ stands for an alkenylene radical may be reduced, for example by catalytic hydrogenation, for example using a platinum oxide catalyst in a diluent or solvent, for example ethanol, to the corresponding compound wherein $A$ stands for an alkylene radical. Thus, for example, a compound wherein $A$ stands for the vinylene radical may be converted into the corresponding compound wherein $A$ stands for the ethylene radical.

According to a further feature of the invention we provide a process for the manufacture of the esters of the alkanolamine derivatives of the invention which comprises the interaction of an acid-addition salt of the corresponding unesterified alkanolamine derivative with an acylating agent.

A suitable acylating agent is, for example, an acid halide or acid anhydride derived from an aliphatic carboxylic acid, for example such an acid of not more than 20 carbon atoms, or derived from an aromatic carboxylic acid, for example such an acid of not more than 10 carbon atoms. Thus a suitable acylating agent is, for example, acetic anhydride, acetyl chloride or benzoyl chloride. The acylation may be carried out in a diluent or solvent, which, in the case where an acid anhydride is used as acylating agent, may conveniently be the acid from which the anhydride is derived.

According to a further feature of the invention we provide a process for the manufacture of the oxazolidine derivatives of the alkanolamine derivatives of the invention which comprises the interaction of the corresponding alkanolamine derivative, or an acid-addition salt thereof, with an aldehyde of the formula $R^4.CHO$, wherein $R^4$ has the meaning stated above.

The said interaction may be carried out in a diluent or solvent, for example ethanol, optionally in the presence of a catalyst, for example hydrochloric acid, acetic acid or iodine, and it may be accelerated or completed by the application of heat. The water formed during the reaction may optionally be removed by azeotropic distillation using a suitable solvent, for example benzene, toluene or chloroform, as entraining agent, or it may optionally be removed by means of a dehydrating agent, for example anhydrous potassium carbonate.

The alkanolamine derivatives of the invention and the esters and aldehyde-condensation products thereof in free base form may be converted into acid-addition salts thereof by interaction with an acid by conventional means.

As stated above, the alkanolamine derivatives of the invention and the esters, aldehyde-condensation products and acid-addition salts thereof are of value in the treatment or prophylaxis of heart diseases. Furthermore, some of these compounds possess selective $\beta$-adrenergic blocking activity. Compounds exhibiting this selective action show a greater degree of specificity in blocking the cardiac $\beta$-receptors than the $\beta$-receptors in peripheral blood vessels and bronchial muscle. Thus, a dose may be selected for such a compound at which the compound blocks the cardiac inotropic and chronotropic actions of a catecholamine [for example isoprenaline, that is, 1-(3,4-dihydroxyphenyl)-2-isopropylaminoethanol] but does not block the relaxation of tracheal smooth muscle produced by isoprenaline or the peripheral vasodilator action of isoprenaline. Because of this selective action, one of these compounds may advantageously be used together with a sympathomimetic bronchodilator, for example isoprenaline, orciprenaline, adrenaline or ephedrine, in the treatment of asthma and other obstructive airways diseases, inasmuch as the selective compound will substantially inhibit the unwanted stimulatory effects of the bronchodilator on the heart but will not hinder the desirable therapeutic effect of the bronchodilator.

Many compounds possessing $\beta$-adrenergic blocking activity are known, many of these being 1-aryloxy-3-amino-2-propanol derivatives, and it is also known that some of these compounds, especially those wherein the 1-aryloxy radical bears an acylamino substituent, possess selective $\beta$-adrenergic blocking activity. It is a desirable, although no absolutely essential, feature of a $\beta$-adrenergic blocking agent which is to be used clinically that the agent does not possess any substantial amount of intrinsic sympathomimetic activity. The compound with which most clinical experience has been obtained, propranolol [1-isopropylamino-3-(naphth-1-yloxy)-2-propanol, which is described and claimed in United Kingdom patent specification No. 994,918], is totally devoid of intrinsic sympathomimetic activity. However, no compound which possesses selective $\beta$-adrenergic blocking activity as defined above is known which is devoid of intrinsic sympathomimetic activity. In particular, the selective $\beta$-adrenergic blocking agent with which most clinical experience has been obtained, practolol [1-(4-acetamidophenoxy)-3-isopropylamino-2-propanol, which is described and claimed in United Kingdom patent specification No. 1,078,852], possesses significant intrinsic sympathomimetic activity.

We have now found that some of the compounds of the present invention, and especially the compounds 1-p-carbamoylmethylphenoxy-3-isopropylamino-2 - propanol and 1-(4-$\beta$-carbamoylethyl-2-methoxyphenoxy)-3-isopropylamino-2-propanol, possess selective $\beta$-adrenergic blocking activity as determined by the inhibition of isoprenaline-induced tachycardia in cats, and by freedom from antagonism of isoprenaline-induced vasodilatation in cats or of the relief produced by isoprenaline of histamine-induced bronchospasm in guinea-pigs. These compounds are, however, devoid of intrinsic sympathomimetic activity as demonstrated by their failure to increase the heart rate of rats from which natural catecholamines have been depleted by pre-treatment with syrosingopine.

According to a further feature of the invention, therefore, we provide pharmaceutical compositions comprising as active ingredient one or more alkanolamine derivatives of the invention, or esters thereof, or aldehyde condensation products thereof, or acid-addition salts thereof, in association with a pharmaceutically-acceptable diluent or carrier therefor.

As suitable compositions there may be mentioned, for example, tablets, capsules, aqueous or oily solutions or suspensions, emulsions, injectable aqueous or oily solutions or suspensions, dispersible powders, sprays and aerosol formulations.

The pharmaceutical compositions of the invention may contain, in addition to the alkanolamine derivative of the invention, one or more drugs selected from sedatives, for example phenobarbitone, meprobamate and chloropromazine; vasodilators, for example glyceryl trinitrate, pentaerythritol tetranitrate and isosorbide dinitrate; diuretics, for example chlorothiazide; hypotensive agents, for example reserpine, bethanidine and guanethidine; myocardial depressants, for example quinidine; agents used in the treatment of Parkinson's disease, for example benzhexol, cardiotonic agents, for example digitalis preparations; and sympathomimetic bronchodilators, for example isoprenaline, orciprenaline, adrenaline and ephedrine.

It is expected that the alkanolamine derivative would be given to man at a total oral dose of between 20 mg. and 600 mg. daily, at doses spaced at 6-8 hourly intervals, or at an intravenous dose of between 1 mg. and 20 mg. Preferred oral dosage forms are tablets or capsules containing between 10 and 100 mg., and preferably 10 mg. or 40 mg., of active ingredient. Preferred intravenous dosage forms are sterile aqueous solutions of the alkanolamine derivative or of a non-toxic acid-addition salt thereof, containing between 0.05% and 1% w./v. of active ingredient, and more particularly containing 0.1% w./v. of active ingredient.

The invention is illustrated but not limited by the following examples:

EXAMPLE 1

A solution of 1 g. of 1-p-carbamoylmethylphenoxy-2,3-epoxypropane and 10 ml. of isopropylamine in 25 ml. of methanol is heated in a sealed tube at 110° C. for 12 hours. The mixture is evaporated to dryness and the residue is partitioned between 50 ml. of chloroform and 50 ml. of aqueous 2 N-hydrochloric acid. The aqueous acidic layer is separated, made alkaline with sodium carbonate and extracted twice with 50 ml. of chloroform each time. The combined extracts are dried and evaporated to dryness and the residue is crystallised from ethyl acetate. There is thus obtained 1-p-carbamoylmethylphenoxy-3-isopropylamino-2-propanol, M.P. 146-148° C.

The 1 - p - carbamoylmethylphenoxy-2,3-epoxypropane used as starting material may be obtained as follows:

A mixture of 3.2 g. of p-hydroxyphenylacetamide, 25 ml. of epichlorohydrin and 6 drops of piperidine is heated at 95-100° C. for 6 hours. The mixture is cooled and filtered and the solid product is crystallised from methanol. There is thus obtained 1-p-carbamoylmethylphenoxy-2,3-epoxypropane, M.P. 158-160° C.

EXAMPLE 2

A solution of 4 g. of ethyl p-(3-chloro-2-hydroxypropoxy)phenylacetate and 15 ml. of isopropylamine in 15 ml. of methanol is heated in a sealed tube at 110° C. for 12 hours. The mixture is evaporated to dryness and the residue is partitioned between ethyl acetate and water. The ethyl acetate layer is separated, dried and evaporated to dryness and the residue is crystallised from a mixture of ethyl acetate and petroleum ether (B.P. 60-80° C.). There is thus obtained 1-p-(N-isopropylcarbamoylmethyl) phenoxy-3-isopropylamino-2-propanol, M.P. 132-134° C.

The ethyl p-(3-chloro-2-hydroxypropoxy)phenylacetate used as starting material may be obtained as follows:

A mixture of 2 g. of ethyl p-hydroxyphenylacetate, 25 ml. of epichlorohydrin and 6 drops of piperidine is heated at 95-100° C. for 6 hours and then evaporated to dryness. The residual oil consists of ethyl p-(3-chloro-2-hydroxypropoxy)phenyl acetate and is used without further purification.

EXAMPLE 3

A solution of 1.2 g. of 1-(4-β-carbamoylethyl-2-methoxyphenoxy)-2,3-epoxypropane and 10 ml. of isopropylamine in 20 ml. of methanol is heated under reflux for 16 hours, cooled and evaporated to dryness under reduced pressure. The residue is crystallised from a mixture of ethyl acetate and petroleum ether (B.P. 60–80° C.) and there is thus obtained 1-(4-β-carbamoylethyl-2-methoxyphenoxy) - 3 - isopropylamino - 2-propanol, M.P. 108–109° C.

The 1 - (4 - β-carbamoylethyl-2-methoxyphenoxy)-2,3-epoxypropane used as starting material may be obtained as follows:

A mixture of 10 g. of ethyl β-(4-hydroxy-3-methoxyphenoxy)-propionate and 200 ml. of aqueous ammonium hydroxide solution (specific gravity 0.880) is kept at room temperature for 16 hours and is then evaporated to dryness under reduced pressure. The residue is crystallised from water and there is thus obtained β-(4-hydroxy-3-methoxyphenoxy)propionamide, M.P. 110–112° C. A mixture of 2 g. of this propionamide, 20 ml. of epichlorohydrin and 5 drops of piperidine is heated at 95–100° C. for 7 hours, cooled and evaporated to dryness under reduced pressure. The residue is crystallised from methanol and there is thus obtained 1 - (4-β-carbamoylethyl-2-methoxyphenoxy)-2,3-epoxypropane, M.P. 143–144° C.

EXAMPLE 4

A mixture of 1.18 g. of 1-p-formylphenoxy-3-isopropylamino-2-propanol, 0.5 g. of methyl hydrogen malonate, 15 ml. of pyridine and 5 drops of piperidine is heated at 95–100° C. for 16 hours, cooled and evaporated to dryness under reduced pressure. The residue is crystallised from a mixture of ethyl acetate and petroleum ether (B.P. 60–80° C.) and there is thus obtained 3-isopropylamino-1 - p - β-methoxycarbonylvinyl)phenoxy-2-propanol, M.P. 90–92° C.

The 1 - p-formylphenoxy-3-isopropylamino-2-propanol used as starting material may be obtained as follows:

A mixture of 5 g. of 3-chloro-1-p-formylphenoxy-2-propanol and 50 ml. of aqueous N-sodium hydroxide solution is shaken for 4 hours and then extracted twice with 100 ml. of chloroform each time. The combined chloroform extracts are dried and evaporated to dryness under reduced pressure and the residual oil, which consists essentially of 2,3 - epoxy-1-(p-formylphenoxy)propane, is immediately dissolved in 50 ml. of isopropylamine. The solution is heated under reflux for 16 hours, cooled and evaporated to dryness. The residue slowly solidifies, and is crystallised from a mixture of benzene and petroleum ether (B.P. 60–80° C.). There is thus obtained 3-isopropylamino - 1 - p-(N-isopropyliminomethyl)-phenoxy - 2-propanol, M.P. 81–835 C.

A mixture of the above propanol and 150 ml. of aqueous 6 N-hydrochloric acid is heated under reflux for 4 hours and then evaporated to dryness under reduced pressure. The residue is dissolved in water, the solution is made alkaline with solid sodium carbonate and the mixture is extracted with ethyl acetate. The extract is dried and evaporated to dryness and the residue is crystallised from a mixture of benzene and petroleum ether (B.P. 60–80° C.). There is thus obtained 1-p-formylphenoxy-3-isopropylamino-2-propanol, M.P. 86–88° C.

EXAMPLE 5

A mixture of 1.18 g. of 1-p-formylphenoxy-3-isopropylamino-2-propanol, 1.03 g. of malonic acid monoamide, 15 ml. of pyridine and 5 drops of piperidine is heated at 95–100° C. for 18 hours. The pyridine is removed by evaporation and the residue is partitioned between 30 ml. of chloroform and 30 ml. of aqueous 2 N-hydrochloric acid. The aqueous acidic layer is separated, made alkaline with sodium carbonate and extracted twice with 30 ml. of chloroform each time. The combined extracts are dried and evaporated to dryness and the residue is crystallised from ethyl acetate. There is thus obtained 1-p-(β-carbamoylvinyl)phenoxy - 3 - isopropylamino - 2 - propanol, M.P. 135–137° C.

EXAMPLE 6

0.05 g. of platinum oxide catalyst is added to a solution of 0.2 g. of 1-p-(β-carbamoylvinyl)phenoxy-3-isopropylamino-2-propanol in 20 ml. of ethanol and the mixture is shaken in an atmosphere of hydrogen until one molecular proportion of hydrogen is absorbed. The mixture is filtered, the filtrate is evaporated to dryness and the residue is crystallised from ethyl acetate. There is thus obtained 1 - p - (β - carbamoylethyl)phenoxy-3-isopropylamino-2-propanol, M.P. 102–104° C.

EXAMPLE 7

A mixture of 1 g. of 1-p-carbamoylmethylphenoxy-2,3-epoxypropane, 1 g. of 2 - aminopropanol and 20 ml. of methanol is stirred at room temperature for 3 days. The solution is evaporated to dryness and the residue is crystallised from a mixture of methanol and diethyl ether. There is thus obtained 1-p-carbamoylmethylphenoxy-3-(1-methyl - 2 - hydroxyethylamino) - 2-propanol, M.P. 134–136° C.

EXAMPLE 8

A solution of 0.5 g. of 1-[4-(N-isopropylcarbamoylmethyl) - 2-nitrophenoxy]-2,3-epoxypropane in 20 ml. of t-butylamine is heated under reflux for 18 hours. Excess t-butylamine is removed by evaporation and the residue is crystallised from a mixture of ethyl acetate and petroleum ether (B.P. 60–80° C.). There is thus obtained 1 - [4-(N-isopropylcarbamoylmethyl)-2-nitrophenoxy]-3-t-butylamino-2-propanol, M.P. 117–119° C.

The 1 - [4-(N-isopropylcarbamoylmethyl)-2-nitrophenoxy]-2,3-epoxypropane used as starting material may be obtained as follows:

A solution of 1 g. of (4-hydroxy-3-nitrophenyl)acetyl chloride in 25 ml. of benzene is added dropwise to a stirred solution of 5 ml. of isopropylamine in 25 ml. of benzene, and the mixture is stirred for 1 hour and then evaporated to dryness under reduced pressure. The solid residue is extracted with 25 ml. of boiling ethyl acetate, the mixture is filtered and the filtrate is concentrated to a volume of 10 ml. Petroleum ether (B.P. 60–80° C.) is added and the mixture is filtered. The solid residue consists of 4 - (N-isopropylcarbamoylmethyl)-2-nitrophenol, M.P. 123–125° C. A mixture of 1 g. of 4-(N-isopropylcarbamoylmethyl)-2-nitrophenol, 25 ml. of epichlorohydrin and 6 drops of piperidine is heated at 95–100° C. for 6 hours. Excess epichlorohydrin is removed by evaporation and the residue, which consists of 3-chloro-1-[4-(N-isopropylcarbamoylmethyl) - 2-nitrophenoxy]-2-propanol is shaken with 50 ml. of aqueous 1 N-sodium hydroxide solution for 2 hours. The alkaline solution is extracted twice with 30 ml. of chloroform each time and the combined chloroform extracts are washed with water, dried and evaporated to dryness. The residue is crystallised from a mixture of ethyl acetate and petroleum ether (B.P. 60–80° C.) and there is thus obtained 1-[4-(N-isopropylcarbamoylmethyl) - 2-nitrophenoxy] - 2,3-epoxypropane, M.P. 125–127° C.

EXAMPLE 9

A solution of 0.75 g. of 3-isopropylamino-1-p-methoxycarbonylmethylphenoxy-2-propanol in 3 ml. of 63% aqueous hydrazine hydrate is heated at 95–100° C. for 2 hours. 20 ml. of water are added and the mixture is extracted twice with 30 ml. of chloroform each time. The combined chloroform solutions are dried and evaporated to dryness and the residue is crystallised from a mixture of ethyl acetate and petroleum ether (B.P. 60–80° C.). There is thus obtained 1 - p-carbazoylmethylphenoxy-3-isopropylamino-2-propanol, M.P. 92–93° C.

The 3-isopropylamino - 1 - p - methoxycarbonylmethylphenoxy-2-propanol used as starting material may be obtained as follows:

A solution of 0.5 g. of 1-p-carbamoylmethylphenoxy-3-isopropylamino-2-propanol in 50 ml. of methanol is saturated with anhydrous hydrogen chloride and is heated under reflux for 3 hours. The solution is evaporated to dryness, the residue is dissolved in water and the solution is basified with sodium carbonate. The basic solution is extracted twice with 30 ml. of chloroform each time and the combined chloroform extracts are dried and evaporated to dryness. The residue is crystallised from petroleum ether (B.P. 60–80° C.) and there is thus obtained 3 - isopropylamino-1-p-methoxycarbonylmethylphenoxy-2-propanol, M.P. 65–67° C.

EXAMPLE 10

A solution of 1 g. of 1-(2-bromo-4-carbamoylmethylphenoxy)-3-chloro-2-propanol and 10 ml. of isopropylamine in 15 ml. of methanol is heated in a sealed tube at 110° C. for 12 hours. The mixture is evaporated to dryness and the residue is partitioned between 40 ml. of chloroform and 40 ml. of aqueous 2 N-hydrochloric acid. The aqueous acidic layer is separated, made alkaline with sodium carbonate and extracted twice with 30 ml. of chloroform each time. The combined extracts are dried and evaporated to dryness and the residue is crystallised from a mixture of benzene and petroleum ether (B.P. 60–80° C.). There is thus obtained 1-(2-bromo-4-carbamoylmethylphenoxy)-3-isopropylamino-2-propanol, M.P. 105–107° C.

The 1-(2-bromo - 4 - carbamoylmethylphenoxy) - 3-chloro-2-propanol used as starting material may be obtained as follows:

A solution of 15 g. of (3-bromo-4-hydroxyphenyl)acetic acid in 50 ml. of ethanol containing 1.0 ml. of sulphuric acid is heated under reflux for 4 hours. The solution is evaporated to half of its original volume and poured into 250 ml. of water. The suspension is extracted twice with 100 ml. of ether each time and the combined ethereal extracts are dried and evaporated to dryness. The residual oil is distilled at 134–138° C./0.5 mm. and there is thus obtained ethyl (3-bromo-4-hydroxyphenyl)acetate. The distilled product is suspended in 200 ml. of aqueous ammonium hydroxide solution (specific gravity 0.880) and the suspension is heated at 110° C. for 6 hours. The resulting solution is evaporated to dryness under reduced pressure and the solid residue is crystallised from water and then from ethanol. There is thus obtained (3-bromo-4-hydroxyphenyl)acetamide, M.P. 176–178° C. A mixture of 1 g. of (3-bromo-4-hydroxyphenyl)acetamide, 10 ml. of epichlorohydrin and 3 drops of piperidine is heated at 95–100° C. for 6 hours and is then evaporated to dryness. The residual oil consists of 1-(2-bromo-4-carbamoylmethylphenoxy)-3-chloro-2-propanol and is used without further purification.

EXAMPLE 11

A mixture of 1.33 g. of 3-isopropylamino-1-(4-formyl-2-methoxyphenoxy)-2-propanol, 1.18 g. of methyl hydrogen malonate, 15 ml. of pyridine and 5 drops of piperidine is heated at 95–100° C. for 72 hours. The pyridine is removed by evaporation and the residue is partitioned between 30 ml. of chloroform and 30 ml. of dilute aqueous potassium carbonate solution. The chloroform layer is separated, dried and evaporated to dryness and the residue is crystallised from petroleum ether (B.P. 60–80° C.). There is thus obtained 3-isopropylamino-1-(2-methoxy - 4 - β - methoxycarbonylvinylphenoxy)-2-propanol, M.P. 79–80° C.

The 3-isopropylamino-1-(4-formyl - 2 - methoxyphenoxy)-2-propanol used as starting material may be obtained as follows:

A mixture of 50 g. of vanillin, 77 ml. of epichlorohydrin and 0.33 g. of piperidine hydrochloride is heated at 95–100° C. for 4 hours. The excess epichlorohydrin is removed by evaporation under reduced pressure and the residue is distilled at 178–183° C./0.6–0.7 mm. The distilled product is stirred rapidly with 400 ml. of aqueous N-sodium hydroxide solution for 4 hours, and the solid is extracted from the mixture with 400 ml. of chloroform. The chloroform solution is dried and evaporated to dryness and there is thus obtained as residue 1-(4-formyl-2-methoxyphenoxy)-2,3-epoxypropane, a pale yellow solid which is used without further purification. A solution of 5 g. of 1-(4-formyl-2-methoxyphenoxy)-2,3-epoxypropane and 50 ml. of isopropylamine in 50 ml. of chloroform is heated under reflux for 18 hours. The mixture is evaporated to dryness and the residue is crystallised from a mixture of benzene and petroleum ether (B.P. 60–80° C.). There is thus obtained 1-[2-methoxy-4-(N-isopropyliminomethyl)phenoxy]-3-isopropylamino-2-propanol. A mixture of the above compound, 75 ml. of concentrated aqueous hydrochloric acid and 75 ml. of water is heated under reflux for 4 hours. The aqueous hydrochloric acid is removed by evaporation and the residue is partitioned between 100 ml. of chloroform and 100 ml. of aqueous 2 N-hydrochloric acid. The aqueous acidic layer is separated, made alkaline with sodium carbonate and extracted twice with 100 ml. of chloroform each time. The combined extracts are dried and evaporated to dryness. The residual basic oil is converted to the oxalate thereof by conventional means, and the oxalate is crystallised from a mixture of methanol and water. The oxalate is reconverted to the free base by conventional means, and the base is crystallised from a mixture of ethyl acetate and petroleum ether (B.P. 60–80° C.). There is thus obtained 3-isopropylamino-1-(4-formyl-2-methoxyphenoxy)-2-propanol, M.P. 56–58° C.

EXAMPLE 12

A solution of 2.5 g. of 1-m-carbamoylmethylphenoxy-3-chloro-2-propanol and 15 ml. of isopropylamine in 25 ml. of methanol is heated in a sealed tube at 110° C. for 12 hours. The mixture is evaporated to dryness and the residue is partitioned between 100 ml. of chloroform and 100 ml. of aqueous 2 N-hydrochloric acid. The aqueous acidic layer is separated, made alkaline with sodium carbonate and extracted twice with 100 ml. of chloroform each time. The combined extracts are dried and evaporated to dryness and the residue is crystallised from benzene. There is thus obtained 1-m-carbamoylmethylphenoxy-3-isopropylamino-2-propanol, M.P. 82–84° C., which crystallises with half a molecule of benzene of crystallisation.

The 1-m-carbamoylmethylphenoxy-3-chloro-2-propanol used as starting material may be obtained as follows:

A mixture of 2.5 g. of m-hydroxyphenylacetamide, 50 ml. of epichlorohydrin and 6 drops of piperidine is heated at 95–100° C. for 6 hours and then evaporated to dryness. The residual oil consists of 1-m-carbamoylmethylphenoxy-3-chloro-2-propanol and is used without further purification.

EXAMPLE 13

A solution of 1.5 g. of 1-(2-allyl-4-carbamoylmethylphenoxy)-3-chloro-2-propanol and 10 ml. of isopropylamine in 15 ml. of methanol is heated in a sealed tube at 110° C. for 12 hours. The mixture is evaporated to dryness and the residue is partitioned between 50 ml. of chloroform and 50 ml. of aqueous 2 N-hydrochloric acid. The aqueous acidic layer is separated, made alkaline with sodium carbonate and extracted twice with 50 ml. of chloroform each time. The combined extracts are dried and evaporated to dryness and the residue is converted to the hydrogen oxalate thereof by conventional means. The hydrogen oxalate is crystallised from a mixture of methanol and diethyl ether and there is thus obtained 1-(2-allyl-4-carbamoylmethylphenoxy) - 3 - isopropylamino-2-propanol hydrogen oxalate, M.P. 101–102° C.

The 1-(2-allyl-4-carbamoylmethylphenoxy)-3-chloro-2-propanol used as starting material may be obtained as follows:

A mixture of 6 g. of 4-hydroxyphenylacetamide, 200 ml. of acetone, 4.4 g. of allyl bromide, 2.8 gm. of solid potassium carbonate and a trace of potassium iodide is stirred and heated under reflux for 16 hours. 200 ml. of water are then added and the acetone is removed by evaporation under reduced pressure. The suspension is extracted twice with 200 ml. of chloroform each time, and the combined chloroform extracts are dried and evaporated to dryness. The solid residue is crystallized from methanol and there is thus obtained 4-allyloxyphenylacetamide, M.P. 178–179° C. A solution of 4 g. of 4-allyloxyphenylacetamide in 50 ml. of diphenyl ether is heated under reflux for 10 minutes. The mixture is cooled, 200 ml. of chloroform are added and the mixture is extracted twice with 100 ml. of aqueous 2 N-sodium hydroxide solution each time. The combined extracts are acidified and the resulting suspension is extracted twice with 100 ml. of chloroform each time. The combined chloroform extracts are dried and evaporated to dryness and the residue is crystallised from warm water. There is thus obtained 3-allyl-4-hydroxyphenylacetamide, M.P. 80–82° C. A mixture of 1.5 g. of 3-allyl-4-hydroxyphenylacetamide, 15 ml. of epichlorohydrin and 4 drops of piperidine is heated at 95–100° C. for 6 hours and then evaporated to dryness. The residual oil consists of 1-(2-allyl - 4 - carbamoylmethylphenoxy) - 3 - chloro-2-propanol and is used without further purification.

EXAMPLE 14

A solution of 1 g. of 3-chloro-1-p-(N-methylcarbamoylmethyl)phenoxy-2-propanol and 20 ml. of isopropylamine in 15 ml. of methanol is heated in a sealed tube at 110° C. for 12 hours. The mixture is evaporated to dryness and the residue is partitioned between 40 ml. of chloroform and 50 ml. of aqueous 2 N-hydrochloric acid. The aqueous acidic layer is separated, made alkaline with sodium carbonate and extracted twice with 30 ml. of chloroform each time. The combined extracts are dried and evaporated to dryness and the residue is crystallized from a mixture of ethylacetate and petroleum ether (B.P. 60–80° C.). There is thus obtained 3-isopropylamino-1-p-(N-methylcarbamoylmethyl)phenoxy-2-propanol, M.P. 87–89° C.

The 3-chloro-1-p-(N-methylcarbamoylmethyl)phenoxy-2-propanol used as starting material may be obtained as follows:

A mixture of 2 g. of ethyl (p-hydroxyphenyl)acetate and 40 ml. of a 40% aqueous solution of monomethylamine is stirred for 24 hours and is then evaporated to dryness. The residual brown oil solidifies on standing and is crystallized from ethyl acetate. There is thus obtained p-hydroxyphenyl-N-methylacetamide, M.P. 119–121° C. A mixture of 1 g. of p-hydroxyphenyl-N-methylacetamide, 10 ml. of epichlorohydrin and 3 drops of piperidine is heated at 95–100° C. for 6 hours and then evaporated to dryness. The residual oil consists of 3-chloro-1-p-(N-methylcarbamoylmethyl)phenoxy-2-propanol and is used without further purification.

EXAMPLE 15

The process described in Example 1 is repeated except that t-butylamine is used in place of isopropylamine. There is thus obtained 1-p-carbamoylmethylphenoxy-3-t-butylamino-2-propanol, M.P. 119–120° C.

EXAMPLE 16

The process described in Example 3 is repeated except that t-butylamine is used in place of isopropylamine, and that the product is isolated by conventional means as the hydrogen oxalate. There is thus obtained 1-(4-β-carbamoylethyl - 2 - methoxyphenoxy) - 3 - t-butylamino-2-propanol hydrogen oxalate, M.P. 148–149° C. (crystallised from a mixture of methanol and ether).

EXAMPLE 17

A solution of 4.2 g. of triethyl phosphonoacetate in 10 ml. of 1,2-dimethoxyethane is added dropwise to a stirred suspension of 1 g. of sodium hydride in 5 ml. of 1,2-dimethoxyethane and the mixture is stirred until a clear solution is obtained. To this stirred solution is added dropwise a solution of 1.4 g. of 1-(4-formyl-2-methoxyphenoxy)-3-isopropylaminopropan-2-ol in 15 ml. of dimethoxyethane and the mixture is stirred for a further 17 hours. The resulting solution is poured onto 50 g. of ice and the mixture is acidified with aqueous 6 N-hydrochloric acid and washed twice with ethyl acetate (100 ml. each time). The aqueous solution is basified with solid sodium carbonate and extracted three times with chloroform (50 ml. each time), and the combined chloroform extracts are dried and evaporated to dryness. The residue is dissolved in the minimum volume of ethyl acetate and 100 ml. of petroleum ether (B.P. 60–80° C.) are added. The mixture is allowed to stand until a clear solution separates from an oily precipitate, and the clear solution is decanted off and evaporated to dryness. There is thus obtained as residue 1-(4 - β - ethoxycarbonylvinyl-2-methoxyphenoxy)-3-isopropylaminopropan-2-ol as a colourless oil.

EXAMPLE 18

0.25 g. of a 5% palladium-on-charcoal catalyst is added to a solution of 1 g. of 1-p-carbamoylmethylphenoxy-3-N-benzyl-N-isopropylaminopropan-2-ol in 30 ml. of ethanol and the mixture is shaken in an atmosphere of hydrogen until one molecular equivalent of hydrogen has been absorbed. The mixture is filtered and the filtrate is evaporated to dryness. There is thus obtained 1-p-carbamoylmethylphenoxy - 3-isopropylaminopropan-2-ol which is identical with the material described in Example 1.

The 1-p-carbamoylmethylphenoxy - 3-N-benzyl-N-isopropylaminopropan-2-ol used as starting material may be obtained as follows:

A mixture of 1 g. of 1-p-carbamoylmethylphenoxy-2,3-epoxypropane, 25 ml. of methanol and 0.75 g. of N-benzylisopropylamine is heated in a sealed tube at 110° C. for 12 hours and is then evaporated to dryness. The residue is partitioned between 50 ml. of aqueous N-hydrochloric acid and 50 ml. of chloroform, and the hydrochloric acid solution is separated, basified with solid sodium carbonate and extracted twice with 50 ml. of chloroform each time. The combined chloroform extracts are dried and evaporated to dryness and there is thus obtained a residue 1-p-carbamoylmethylphenoxy-3-N-benzyl-N-isopropylaminopropan-2-ol.

EXAMPLE 19

A solution of 1.33 g. of 1-(p-carbamoylmethylphenoxy)-3-isopropylaminopropan-2-ol and 2 ml. of 37% w./v. aqueous Formalin in 20 ml. of absolute ethanol is heated under reflux for 15 hours. The solution is then evaporated to dryness and the solid residue is crystallised from ethanol. There is thus obtained 5-(p-carbamoylmethylphenoxymethyl) - 3-isopropyloxazolidine, M.P. 170–171° C.

EXAMPLE 20

3.8 g. of 1-chloro-3-isopropylaminopropan-2-ol hydrochloride are added to a solution of 3 g. of 4-hydroxyphenylacetamide and 1.6 g. of sodium hydroxide in 40 ml. of water and the resulting solution is heated at 90–95° C. for 18 hours. The mixture is basified to pH 10 and extracted three times with 50 ml. of chloroform each time. The combined chloroform extracts are dried and evaporated to dryness and the residue is extracted three times with 50 ml. of cyclohexane each time. The residue is dissolved in 10 ml. of ethyl acetate and the ethyl acetate solution is diluted with 15 ml. of petroleum ether (B.P. 60–80° C.) which is added portionwise during several hours. The mixture is kept at 0° C. for 17 hours and then filtered and the semi-solid residue is crystallised from ethyl acetate. There is thus obtained 1-p-carbamoylmethylphenoxy-3-isopropylaminopropan-2-ol which is identical with the material described in Example 1.

EXAMPLE 21

0.5 g. of a 5% palladium-on-charcoal catalyst is added to a solution of 1.2 g. of 1-p-carbamoylmethylphenoxy-3-aminopropan-2-ol in 50 ml. of acetone and the mixture is shaken in an atmosphere of hydrogen until one molecular proportion of hydrogen is absorbed. The mixture is filtered, the solid residue is extracted twice with 100 ml. of boiling ethyl acetate each time and the combined organic solution is evaporated to dryness. There is thus obtained as residue 1-p-carbamoylmethylphenoxy-3-isopropylaminopropan-2-ol which is identical with the material described in Example 1.

The 1-p - carbamoylmethylphenoxy-3-aminopropan-2-ol used as starting material may be prepared as follows:

Ammonia gas is bubbled for 1 hour through a solution of 1 g. of 1-p-carbamoylmethylphenoxy - 2,3 - epoxypropane in 50 ml. of methanol. The solution is kept at room temperature for 3 days and is then evaporated to dryness. There is thus obtained as residue 1-p-carbamoylmethylphenoxy-3-aminopropan-2-ol, a crystalline solid which is used without further purification.

EXAMPLE 22

Sufficient methanol to give a clear solution is added to a suspension of 5.2 g. of 1-[2-methoxy-4-(3-oxobut-1-enyl)phenoxy]-2,3-epoxypropane in 100 ml. of t-butylamine, and the solution is kept at room temperature for 3 days and is then evaporated to dryness. The residue is crystallised from a mixture of ethyl acetate and petroleum ether (B.P. 60–80° C.) and there is thus obtained 1-[2-methoxy - 4-(3-oxobut - 1-enyl)phenoxy]-3-t-butylamino-2-propanol, M. P. 62–64° C.

The 1-[2-methoxy-4-(3-oxobut-1-enyl)phenoxy] - 2,3-epoxypropane used as starting material may be obtained as follows:

A mixture of 12.5 g. of vanillin (4-hydroxy-3-methoxybenzaldehyde), 50 ml. of acetone and 40 ml. of 9% aqueous sodium hydroxide solution is kept at room temperature for 3 days, 100 ml. of water are added, the excess of acetone is removed by evaporation under reduced pressure and the residue is acidified with 20% aqueous acetic acid solution. The mixture is filtered and the solid product is crystallised from aqueous ethanol. There is thus obtained 4-(4-hydroxy-3-methoxyphenyl)-but-3-en-2-one, M.P. 119–122° C.

A mixture of 11.3 g. of the above product, 110 ml. of epichlorohydrin and 6 drops of piperidine is heated at 90–95° C. for 6 hours. The excess of epichlorohydrin is removed by evaporation under reduced pressure and the residue is stirred with 200 ml. of N-aqueous sodium hydroxide solution at room temperature for 3 hours. The mixture is filtered and the solid product is crystallised from benzene. There is thus obtained 1-[2-methoxy-4-(3-oxobut-1-enyl)phenoxy] - 2,3-epoxypropane, M.P. 109–112° C.

EXAMPLE 23

The process described in Example 22 is repeated except that 1 - [2 - methoxy-4-(3-oxobutyl)phenoxy]-2,3-epoxypropane and isopropylamine are used as starting materials. There is thus obtained 1-[2-methoxy-4-(3-oxobutyl)phenoxy]-3-isopropylamino-2-propanol, M.P. 71–72° C.

The 1-[2-methoxy-4-(3-oxobutyl)phenoxy]-2,3-epoxypropane (B.P. 168° C./0.6 mm.) used as starting material may be obtained by a similar process to that described in the last part of Example 22, except that 4-(4-hydroxy-3-methoxyphenyl)butan-2-one [B.P. 126° C./0.4 mm., prepared by hydrogenation of 4-(4-hydroxy-3-methoxyphenyl)but-3-en-2-one in ethanol solution at room temperature and atmospheric pressure, using Raney nickel as catalyst] is used as starting material.

EXAMPLE 24

A solution of 0.4 g. of 1-(2-allyl-4-N-methylcarbamoylmethylphenoxy)-3-isopropylamino-2-propanol in 50 ml. of ethanol is shaken with 0.2 g. of a 5% palladium-on-charcoal catalyst in an atmosphere of hydrogen at atmospheric pressure and ambient temperature until uptake of hydrogen ceases. The mixture is filtered, the filtrate is evaporated to dryness and the residue is crystallised from ethyl acetate. There is thus obtained 1-(4-N-methylcarbamoylmethyl-2-n-propylphenoxy)-3-isopropylamino-2-propanol, M.P. 125–127° C.

EXAMPLE 25

The process described in Example 10 is repeated using the appropriate 1-p-carbamoylmethylphenoxy-3-chloro-2-propanol derivative and isopropylamine or t-butylamine as starting materials, and there are thus obtained the compounds described in the following table:

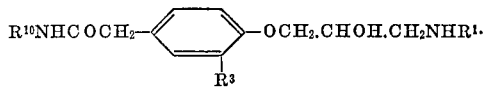

| $R^{10}$ | $R^3$ | $R^1$ | M.P. (° C.) |
|---|---|---|---|
| H | Methoxy | Isopropyl | 118–120 |
| H | do | t-Butyl | 87–89 |
| H | Iodo | Isopropyl | 126–128 |
| H | Methyl | do | 126–127 |
| H | s-Butyl | do | [1] 124–130 |
| H | n-Propyl | do | 116–117 |
| n-Butyl | H | do | 115–117 |
| Do | H | t-Butyl | [2] 211–213 |
| Allyl | H | Isopropyl | 112–114 |
| Methyl | Allyl | do | 106–108 |
| Do | do | t-Butyl | [2] 187–189 |
| Allyl | do | Isopropyl | 94–96 |

[1] Hydrogen oxalate.
[2] Oxalate.

There are also prepared, by a similar process to that described in Example 10 using the appropriate starting materials, 1-o-carbamoylmethylphenoxy-3 - isopropylamino-2-propanol hydrogen oxalate, M.P. 146–148° C.; 1(4-carbamoylmethyl-3-methylphenoxy)-3-isopropylamino-2-propanol, M.P. 132–134° C.; 1-(4-carbamoylmethyl-2,3-dimethylphenoxy)-3-isopropylamino-2-propanol hydrogen oxalate, M.P. 213–215° C. and 1-(4-carbamoylmethyl-2,5-dimethylphenoxy)-3-isopropylamino-2-propanol, M.P. 111–113° C.

The 1-p-carbamoylmethylphenoxy-3-chloro-2-propanol derivatives used as starting materials may be obtained by the recation of the corresponding phenols with epichlorohydrin by a similar process to that described at the end of Example 10. Many of the phenols themselves are novel compounds, and these may be obtained by conventional chemical methods using known starting materials, as follows:

(3-methoxy - 4 - hydroxphenyl)acetamide, M.P. 113–115° C. and (3-iodo-4-hydroxyphenyl)acetamide, M.P. 179–181° C. are obtained from the corresponding acetic acid derivatives by a similar process to that described in Example 10 for the preparation of (3-bromo-4-hydroxyphenyl)acetamide.

(3-methyl-4-hydroxyphenyl)acetamide, M.P. 138–140° C.; (3-s-butyl - 4 - hydroxyphenyl)acetamide, M.P. 110–116° C.; (2-methyl-4 - hydroxyphenyl)acetamide, M.P. 164–166° C.; (2,3-dimethyl-4-hydroxyphenyl)acetamide, M.P. 96–98° C. and (2,5-dimethyl-4-hydroxyphenyl)acetamide, M.P. 160–163° C. are also similarly obtained from the corresponding acetic acid derivatives, in the case of the 3-s-butyl derivative the methyl rather than the ethyl ester being used. (3-methyl-4-hydroxyphenyl)acetic acid, M.P. 98–101° C., is itself prepared by heating 3-methyl-4-hydroxyacetophenone with sulphur and morpholine (the Willgerodt reaction) and hydrolysing the product with aqueous sodium hydroxide solution. (2-methyl-4-hydroxyphenyl)acetic acid, M.P. 147–149° C., is similarly obtained from 2-methyl-4-hydroxyacetophenone. (3-s-butyl-4-hydroxyphenyl)acetic acid (an oil) is similarly obtained from 3-s-butyl-4-hydroxyacetophenone, M.P. 128–130° C., which itself is obtained by reacting 2-s-butylphenol with acetic anhydride, and then reacting the 2-s-butylphenyl acetate thus obtained with aluminium chloride in nitrobenzene solution. (2,3-dimethyl-4-hydroxy)acetic acid (M.P. not recorded) and (2,5-dimethyl-4-hydroxyphenyl) acetic acid, M.P. 150–151° C. are similarly obtained from 2,3-dimethylphenol and 2,5-dimethylphenol respectively, by way of, respectively, 2,3-dimethylphenyl acetate and 2,3-dimethyl-4-hydroxyacetophenone, M.P. 141–142° C. and 2,5-dimethylphenyl acetate and 2,5-dimethyl-4-hydroxyacetophenone, M.P. 128–129° C.

(3-n-propyl - 4 - hydroxyphenyl)acetamide, M.P. 115–116° C., is obtained by the hydrogenation of (3-allyl-4-hydroxyphenyl)acetamide (Example 13) in ethanol solution with hydrogen in the presence of a 5% palladium-on-charcoal catalyst.

4-hydroxyphenyl-N-n-butylacetamide, B.P. 204° C./0.5 mm. and 4-hydroxyphenyl-N-allylacetamide, M.P. 79–80° C. are obtained by reacting 4-hydroxyphenylacetic acid with acetyl chloride and then with thionyl chloride, reacting the 4-acetoxyphenylacetyl chloride thus obtained in benzene solution with, respectively, n-butylamine and allylamine, and rapidly hydrolysing the 4-acetoxyphenylacetamide derivative thus obtained with aqueous sodium hydroxide solution at room temperature.

(3-allyl-4-hydroxyphenyl)-N - methylacetamide, M.P. 78–80° C. and (3-allyl-4-hydroxyphenyl)-N-allylacetamide, M.P. 75–76° C. are obtained from 4-hydroxyphenyl-N-methylacetamide (Example 14) and 4-hydroxyphenyl-N-allylacetamide respectively by a similar process to that described in Example 13 for the preparation of (3-allyl-4-hydroxyphenyl)acetamide. The intermediate products 4-allyloxyphenyl-N-methylacetamide, M.P. 64–66° C., and 4-allyloxyphenyl-N-allylacetamide, M.P. 78–80° C., have the melting points shown.

EXAMPLE 26

The process described in Example 10 is repeated except that 1-p-cyanomethylphenoxy-3-chloro-2-propanol (prepared from p-hydroxyphenylacetonitrile and epichlorohydrin by a similar process to that described at the end of Example 10) is used as starting material in place of 1 - (2-bromo-4-carbamoylmethylphenoxy)-3-chloro-2-propanol. There is thus obtained 1-p-cyanomethylphenoxy-3-isopropylamino-2-propanol, M.P. 63–65° C. (crystallised from a mixture of benzene and petroleum ether B.P. 60–80° C.).

EXAMPLE 27

A suspension of 1 g. of 1-p-ethoxycarbonylmethylphenoxy-3-isopropylamino-2-propanol in 75 ml. of aqueous ammonia solution (specific gravity 0.88) is stirred at room temperature for 18 hours and the resulting solution is then evaporated to dryness. There is thus obtained 1-p-carbamoylmethylphenoxy-3-isopropylamino - 2 - propanol which is identical with the material described in Example 1.

The 1-p-ethoxycarbonylmethylphenoxy - 3 - isopropylamino-2-propanol used as starting material may be obtained as follows:

Hydrogen chloride gas is bubbled for 6 hours through a boiling solution of 4.5 g. 1-p-cyanomethylphenoxy-3-isopropylamino-2-propanol (Example 26) in 150 ml. of absolute ethanol and the solution is kept at room temperature for a further 16 hours and is then evaporated to dryness. The residue is dissolved in 100 ml. of water and the solution is basified with solid sodium carbonate and extracted twice with 100 ml. of chloroform each time. The combined chloroform extracts are dried and evaporated to dryness. The residue is dissolved in the minimum quantity of ethyl acetate, 100 ml. of petroleum ether (B.P. 60–80° C.) is added and the mixture is allowed to stand for 30 minutes. The supernatent liquid is decanted off and evaporated to dryness and the residue is crystallised from petroleum ether (B.P. 60–80° C.). There is thus obtained 1-p-ethoxycarbonylmethylphenoxy-3-isopropylamino-2-propanol, M.P. 51–52° C.

EXAMPLE 28

The process described in Example 10 is repeated using the appropriate 1-phenoxy-3-chloro-2-propanol derivative and isopropylamine as starting materials, and there are thus obtained the compounds described in the following table:

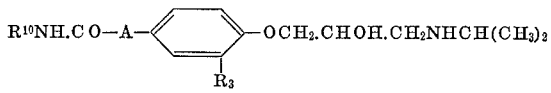

| $R^{10}$ | A | $R^3$ | M.P. (° C.) |
|---|---|---|---|
| H | —CH$_2$CH$_2$— | Bromo | 102–104 |
| H | —CH$_2$CH$_2$CH$_2$— | do | 69–71 |
| H | —CH$_2$CH$_2$— | Nitro | 130–132 |
| H | —CH(CH$_3$)— | H | 101–104 |
| H | —CH$_2$CH$_2$— | Allyl | 93–95 |
| H | —CH$_2$CH$_2$CH$_2$— | do | 78–80 |
| Isopropyl | —CH$_2$CH$_2$— | Nitro | 108–110 |
| H | —CH=CH— | Methoxy | 138–140 |
| Isopropyl | —CH=CH— | do | 123–125 |
| H | —CH$_2$CH$_2$CH$_2$— | H | 85–87 |

There are also prepared, by a similar process to that described in Example 10 using the appropriate starting materials, 1-(4-β-cyanovinyl - 2 - methoxyphenoxy)-3-isopropylamino-2-propanol, M.P. 102–104° C. and 1-(4-β-cyanoethylphenoxy)-3-isopropylamino-2-propanol, M.P. 66–68° C.

The 1-phenoxy-3-chloro-2-propanol derivatives used as starting materials may be obtained by the reaction of the corresponding phenols with epichlorohydrin by a similar process to that described at the end of Example 10. Many of the phenols themselves are novel compounds, and these may be obtained by conventional chemical methods using known starting materials as follows:

β-(3-bromo-4-hydroxyphenyl)propionamide, M.P. 130–132° C. and γ-(3-bromo-4-hydroxyphenyl)butyramide, M.P. 48–50° C. are obtained from the corresponding propionic acid derivative and butyric acid derivative respectively by a similar process to that described in Example 10 for the preparation of (3-bromo-4-hydroxyphenyl)acetamide. γ-(3-bromo-4-hydroxyphenyl)butyric acid, M.P. 74–76° C., is itself obtained by the bromination of γ-(4-hydroxyphenyl)butyric acid with bromine in chloroform at room temperature.

β-(3-nitro-4-hydroxyphenyl)propionamide, M.P. 149–151° C.; γ-(4-hydroxyphenyl)butyramide, M.P. 119–121° C. and α-(4-hydroxyphenyl)-propionamide [4-hydroxyhydratropamide], M.P. 120–122° C. are obtained by the reaction of, respectively, the corresponding ethyl propionate, ethyl butyrate and methyl hydratropate with aqueous ammonium hydroxide solution (specific gravity 0.880) at room temperature for 18 hours.

β-(3-allyl-4-hydroxy)propionamide and γ-(3-allyl-4-hydroxy)-butyramide, both oils, are obtained from, respectively, β-(4-hydroxyphenyl)propionamide and γ-(4-hydroxyphenyl)butyramide by a similar process to that described in Example 13 for the preparation of (3-allyl-4-hydroxyphenyl)acetamide. The intermediate products β-(4-allyloxyphenyl)propionamide (M.P. 120–121° C.) and γ-(4-allyloxyphenyl)butyramide (M.P. 91–93° C.) have the melting points shown.

β-(3-nitro-4-hydroxyphenyl) - N - isopropylpropionamide, M.P. 90–92° C.; 3 - methoxy-4-hydroxycinnamamide, M.P. 147–149° C. and N-isopropyl-3-methoxy-4-hydroxycinnamamide, M.P. 177–179° C. are obtained by reacting the corresponding carboxylic acids with acetyl chloride and then with thionyl chloride, reacting the 4-acetoxyphenylacyl chloride derivatives thus obtained with isopropylamine or gaseous ammonia as appropriate, and rapidly hydrolysing the 4-acetoxyphenylacylamide derivatives thus obtained with aqueous sodium hydroxide solution.

What we claim is:

1. A compound selected from alkanolamine derivatives of the formula:

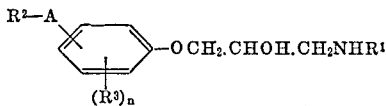

wherein $R^1$ is alkyl or hydroxyalkyl each of up to 6 carbon atoms; wherein $R^2$ is carbamoyl, alkylcarbamoyl or alkenyl-carbamoyl wherein the alkyl or alkenyl part each contains up to 6 carbon atoms; wherein A is alkylene of from 1 to 5 carbon atms or alkenylene of from 2 to 5 carbon atoms; wherein $n$ is 1 or 2; and wherein $R^3$, the values of which may be the same or different when $n$ is 2, is selected from hydrogen, halogen, nitro, hydroxy, cyano, alkyl, alkenyl, alkanoyl and alkoxycarbonyl each of up to 6 carbon atoms, cycloalkyl of up to 8 carbon atoms, alkylthio, phenoxy, alkoxy and alkenyloxy each of up to 5 carbon atoms, phenyl, benzyl, 4-phenylethyl and benzyloxy, and alkyl of up to 5 carbon atoms which is substituted by hydroxy, alkoxy of up to 4 carbon atoms or halogen; and the acid-addition salts thereof.

2. The compound selected from alkanolamine derivatives of the formula given in claim 1, wherein $R^1$ is isopropyl, s-butyl, t-butyl, 2-hydroxy-1,1-dimethylethyl or 2-hydroxy-1-methylethyl; wherein $R^2$ is carbamoyl, methylcarbamoyl, isopropylcarbamoyl, n-butylcarbamoyl or allylcarbamoyl; wherein A is methylene, ethylene, ethylidene, trimethylene or vinylene; wherein $n$ is 1 or 2; and wherein $R^3$, the values of which may be the same or different when $n$ is 2, is selected from hydrogen, fluorine, chlorine, bromine, iodine, methyl, ethyl, n-propyl, s-butyl, cyclopropyl, cyclobutyl, cyclopentyl, allyl, nitro, hydroxy, methylthio, methoxy, isopropoxy, allyloxy, phenyl, phenoxy, benzyl, $\alpha$-phenylethyl, benzyloxy, hydroxymethyl, methoxymethyl, trifluoromethyl, acetyl, propionyl, methoxycarbonyl, ethoxycarbonyl and cyano; and the acid-addition salts thereof.

3. A compound selected from alkanolamine derivatives of the formula:

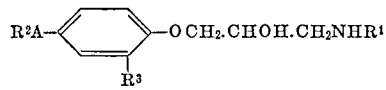

wherein $R^1$, $R^2$, A and $R^3$ have the meanings stated in claim 1, and the acid-addition salts thereof.

4. A compound selected from alkanolamine derivatives of the formula given in claim 3 wherein $R^1$ is isopropyl or t-butyl, $R^2$ is carbamoyl or alkylcarbamoyl wherein the alkyl contains up to 3 carbon atoms, A is methylene and $R^3$ is hydrogen, halogen or alkyl, alkenyl or alkoxy each of up to 4 carbon atoms, and the acid-addition salts thereof.

5. A compound selected from alkanolamine derivatives of the formula given in claim 3 wherein $R^1$ is isopropyl or t-butyl, $R^2$ is carbamoyl, A is ethylene or vinylene and $R^3$ is alkoxy of up to 4 carbon atoms, and the acid-addition salts thereof.

6. A compound selected from 1-p-carbamoylmethylphenoxy-3-isopropylamino-2-propanol and the acid-addition salts thereof.

7. A compound selected from 1-(4-$\beta$-carbamoylethyl-2-methoxyphenoxy)-3-isopropylamino - 2 - propanol and the acid-addition salts thereof.

8. A compound selected from 1-p-(N-isopropylcarbamoylmethyl)-phenoxy-3-isopropylamino-2-propanol;
1-(2-bromo-4-carbamoylmethylphenoxy)-3-isopropylamino-2-propanol;
1-p-carbamoylmethylphenoxy-3-t-butylamino-2-propanol;
1-m-carbamoylmethylphenoxy-3-isopropylamino-2-propanol;
1-(2-allyl-4-carbamoylmethylphenoxy)-3-isopropylamino-2-propanol;
1-(4-carbamoylmethyl-2-methoxyphenoxy)-3-isopropylamino-2-propanol;
1-p-(N-methylcarbamoylmethyl)phenoxy-3-isopropylamino-2-propanol;
1-(4-carbamoylmethyl-2-iodophenoxy)-3-isopropylamino-2-propanol;
1-(4-carbamoylmethyl-2-methylphenoxy)-3-isopropylamino-2-propanol;
1-(4-carbamoylmethyl-2-n-propylphenoxy)-3-isopropylamino-2-propanol;
1-(4-carbamoylmethyl-2-s-butylphenoxy)-3-isopropylamino-2-propanol;
1-(4-carbamoylmethyl-2-methoxyphenoxy)-3-t-butylamino-2-propanol;
1-(4-N-methylcarbamoylmethyl-2-n-propylphenoxy)-3-isopropylamino-2-propanol;
1-(2-allyl-4-N-methylcarbamoylmethylphenoxy)-3-isopropylamino-2-propanol;
1-(2-allyl-4-N-methylcarbamoylmethylphenoxy)-3-t-butylamino-2-propanol;
1-(4-carbamoylmethyl-2,5-dimethylphenoxy)-3-isopropylamino-2-propanol;
1-(4-$\beta$-carbamoylethyl-2-methoxyphenoxy)-3-t-butylamino-2-propanol;

and the acid-addition salts thereof.

9. An acid-addition salt as claimed in claim 1 which is selected from hydrochlorides, hydrobromides, phosphates, sulphates, oxalates, lactates, tartrates, acetates, salicylates, citrates benzoates, $\beta$-naphthoates, adipates and 1,1-methylene-bis(2-hydroxy-3-naphthoates) of any of the compound defined in claim 1.

References Cited
FOREIGN PATENTS 1,078,852    8/1967    Great Britain.

HENRY R. JILES, Primary Examiner

S. D. WINTERS, Assistant Examiner

U.S. Cl. X.R.

260—465 E, 471 A, 570.7, 465 D, 315, 486 R, 490, 477, 559 A, 307 F, 348 A, 348 R, 590, 465 F, 473 G, 473 R, 534 R, 501.19, 526 R, 465.4 485 R, 961; 424—324, 304, 309, 330, 274, 272